(12) United States Patent
Hoshall

(10) Patent No.: US 7,451,568 B2
(45) Date of Patent: Nov. 18, 2008

(54) SUBSURFACE INSECT DETECTION AND PESTICIDE INJECTION SYSTEM

(76) Inventor: Tom Hoshall, 4101 NW. 143rd St., Oklahoma City, OK (US) 73134-1724

( * ) Notice: Subject to any disclaimer, the term of this patent is extended or adjusted under 35 U.S.C. 154(b) by 0 days.

(21) Appl. No.: 12/043,709

(22) Filed: Mar. 6, 2008

(65) Prior Publication Data

US 2008/0216389 A1 Sep. 11, 2008

Related U.S. Application Data

(60) Provisional application No. 60/905,290, filed on Mar. 6, 2007.

(51) Int. Cl.
*A01M 1/20* (2006.01)
*A01M 7/00* (2006.01)
*A01M 17/00* (2006.01)
(52) U.S. Cl. ........................ 43/132.1; 43/124
(58) Field of Classification Search ................. 43/132.1, 43/124
See application file for complete search history.

(56) References Cited

U.S. PATENT DOCUMENTS

| | | | | |
|---|---|---|---|---|
| 1,795,488 | A | * | 3/1931 | Hill ............................... 43/124 |
| 2,059,095 | A | * | 10/1936 | Fellman ........................ 43/124 |
| 2,246,731 | A | * | 6/1941 | Hill ............................... 43/124 |
| 2,842,892 | A | * | 7/1958 | Aldridge et al. ............... 43/124 |
| 2,915,848 | A | * | 12/1959 | Griffin ........................... 43/124 |
| 2,981,025 | A | * | 4/1961 | Woodson ...................... 43/124 |
| 3,124,893 | A | * | 3/1964 | Glenn ............................ 43/124 |
| 3,151,746 | A | * | 10/1964 | Reustle et al. ................. 43/124 |
| 3,209,485 | A | * | 10/1965 | Griffin ........................... 43/124 |
| 3,330,062 | A | * | 7/1967 | Carter ........................... 43/124 |
| 3,513,586 | A | * | 5/1970 | Gushue et al. ................. 43/124 |
| 3,564,750 | A | * | 2/1971 | Burgess ........................ 43/132.1 |

(Continued)

FOREIGN PATENT DOCUMENTS

JP 06327390 A * 11/1994

(Continued)

*Primary Examiner*—Darren W Ark
(74) *Attorney, Agent, or Firm*—Dunlap Codding, P.C.

(57) ABSTRACT

A subsurface pest detection and pesticide injection system in combination with a structure having a foundation including a tubular conduit disposed adjacent the foundation of the structure. The tubular conduit has a plurality of pores extending through the sidewall of the tubular conduit. The tubular conduit is constructed of an elastomeric material such that upon applying a negative internal pressure to the tubular conduit the pores of the tubular conduit are caused to open to permit the drawing of gas into the tubular conduit, and upon removal of the negative internal pressure the pores are caused to close so that the pores remain substantially clog free. A means for applying a negative internal pressure is in gas communication with the tubular conduit to cause the pores of the tubular conduit to open and cause gas to be drawn into the tubular conduit. A gas detecting sensor is in gas communication with the tubular conduit to monitor the gas in the tubular conduit for the presence of a gas that indicates the presence of pests near the foundation of the structure. A source of pressurized pesticide connected to the tubular conduit so as to apply a positive internal pressure to the tubular conduit and cause the pores of the tubular conduit to open and permit the release of pesticide from the tubular conduit adjacent the foundation of the structure.

17 Claims, 6 Drawing Sheets

U.S. PATENT DOCUMENTS

| | | | | |
|---|---|---|---|---|
| 3,602,248 A * | 8/1971 | Peacock | ........................ | 43/124 |
| 3,676,949 A * | 7/1972 | Ramsey | ........................ | 43/124 |
| 3,766,844 A * | 10/1973 | Donnelly et al. | ............ | 454/238 |
| 3,782,026 A * | 1/1974 | Bridges et al. | ................ | 43/124 |
| 3,835,578 A * | 9/1974 | Basile | ........................ | 43/132.1 |
| 3,909,975 A * | 10/1975 | Basile | ........................ | 43/124 |
| 3,911,611 A * | 10/1975 | Brinker | ....................... | 43/124 |
| 3,940,875 A * | 3/1976 | Basile | ........................ | 43/132.1 |
| 3,963,927 A * | 6/1976 | Bruce et al. | ............. | 250/338.1 |
| 4,003,408 A * | 1/1977 | Turner | ........................ | 239/145 |
| 4,016,727 A * | 4/1977 | Osaka et al. | .................. | 405/48 |
| 4,028,841 A * | 6/1977 | Lundwall | ...................... | 43/124 |
| 4,040,215 A * | 8/1977 | Totsuka | ....................... | 43/132.1 |
| 4,095,750 A * | 6/1978 | Gilead | ........................ | 239/542 |
| 4,139,159 A * | 2/1979 | Inoue et al. | .................. | 239/547 |
| 4,181,051 A * | 1/1980 | Drori | .......................... | 239/547 |
| 4,254,916 A * | 3/1981 | Havens et al. | ............... | 239/547 |
| 4,625,474 A * | 12/1986 | Peacock et al. | ............... | 43/124 |
| 4,648,202 A * | 3/1987 | Renth | ......................... | 43/132.1 |
| 4,742,641 A * | 5/1988 | Cretti | ......................... | 43/132.1 |
| 4,800,672 A * | 1/1989 | Jackson | ....................... | 43/125 |
| 4,805,341 A * | 2/1989 | Maeda | ........................ | 43/132.1 |
| 4,817,329 A * | 4/1989 | Forbes | ........................ | 43/132.1 |
| 4,858,375 A * | 8/1989 | Mountain | .................... | 43/124 |
| 4,893,434 A * | 1/1990 | Knipp et al. | .................. | 43/124 |
| 4,941,356 A * | 7/1990 | Pallaske | ...................... | 73/587 |
| 4,961,283 A * | 10/1990 | Forbes | ........................ | 43/132.1 |
| 5,007,197 A * | 4/1991 | Barbett | ....................... | 43/124 |
| 5,054,252 A * | 10/1991 | Newman | ................. | 52/169.14 |
| 5,184,418 A * | 2/1993 | Fletcher | .................... | 43/132.1 |
| 5,231,796 A * | 8/1993 | Sims | ........................... | 43/124 |
| 5,317,831 A * | 6/1994 | Fletcher | ..................... | 43/124 |
| 5,347,749 A * | 9/1994 | Chitwood et al. | .......... | 43/132.1 |
| 5,359,806 A * | 11/1994 | Jeffery et al. | ................ | 43/131 |
| 5,378,086 A * | 1/1995 | Campbell et al. | ............ | 43/124 |
| 5,394,642 A * | 3/1995 | Takaoka | ...................... | 43/124 |
| 5,474,398 A * | 12/1995 | Prassas et al. | ............... | 239/145 |
| 5,542,207 A * | 8/1996 | Morris, Sr. | .................. | 43/132.1 |
| 5,571,967 A * | 11/1996 | Tanaka et al. | ................ | 73/587 |
| 5,575,105 A * | 11/1996 | Otomo | ....................... | 43/132.1 |
| 5,592,774 A * | 1/1997 | Galyon | ........................ | 43/124 |
| 5,815,090 A * | 9/1998 | Su | .............................. | 43/132.1 |
| 5,819,466 A * | 10/1998 | Aesch et al. | .................. | 43/124 |
| 5,836,815 A * | 11/1998 | Jennemann | ................ | 52/169.5 |
| 5,877,422 A * | 3/1999 | Otomo | ....................... | 43/132.1 |
| 5,881,494 A * | 3/1999 | Jenkins | ....................... | 43/124 |
| 5,937,572 A * | 8/1999 | Neumann | .................. | 43/132.1 |
| 5,960,584 A * | 10/1999 | Aesch, Jr. | .................... | 43/124 |
| 6,023,879 A * | 2/2000 | Katz et al. | .................... | 43/124 |
| 6,047,498 A * | 4/2000 | Mann | ........................ | 43/132.1 |
| 6,052,066 A * | 4/2000 | Su | ............................. | 43/132.1 |
| 6,070,357 A * | 6/2000 | Hartill et al. | ................ | 43/132.1 |
| 6,100,805 A * | 8/2000 | Lake | ......................... | 43/132.1 |
| 6,150,944 A * | 11/2000 | Martin et al. | ................. | 43/124 |
| 6,166,641 A * | 12/2000 | Oguchi et al. | ............ | 340/573.1 |
| 6,178,834 B1 * | 1/2001 | Cates | ........................ | 43/132.1 |
| 6,189,393 B1 * | 2/2001 | Cates | ........................ | 73/865.8 |
| 6,199,770 B1 * | 3/2001 | King et al. | ................... | 43/132.1 |
| 6,226,933 B1 * | 5/2001 | Nelson et al. | ................ | 43/124 |
| 6,255,652 B1 * | 7/2001 | Moyer | ........................ | 250/343 |
| 6,266,918 B1 * | 7/2001 | Henderson et al. | ......... | 43/132.1 |
| 6,370,811 B1 * | 4/2002 | Masterson | ................. | 43/132.1 |
| 6,373,391 B1 * | 4/2002 | Lake et al. | ................... | 43/132.1 |
| 6,374,536 B1 * | 4/2002 | Washburn | .................. | 43/132.1 |
| 6,397,518 B2 * | 6/2002 | Mann | ........................ | 43/132.1 |
| 6,446,383 B1 * | 9/2002 | Hoshall | ....................... | 43/132.1 |
| 6,463,694 B1 * | 10/2002 | Manciet | ...................... | 43/132.1 |
| 6,493,987 B1 * | 12/2002 | Aesch et al. | ................ | 43/132.1 |
| 6,519,901 B1 * | 2/2003 | Nelson et al. | ................ | 43/124 |
| 6,526,692 B1 * | 3/2003 | Clark | ......................... | 43/107 |
| 6,564,504 B2 * | 5/2003 | Hoshall | ....................... | 43/132.1 |
| 6,708,444 B2 * | 3/2004 | Aesch, Jr. | .................... | 43/132.1 |
| 6,782,655 B2 * | 8/2004 | Hoshall | ....................... | 43/132.1 |
| 6,801,131 B2 * | 10/2004 | Donskoy et al. | .......... | 340/573.1 |
| 6,834,611 B2 * | 12/2004 | Berthold et al. | ............ | 43/132.1 |
| 6,877,272 B2 * | 4/2005 | Hoshall | ....................... | 43/132.1 |
| 6,892,491 B2 * | 5/2005 | Hedman | ..................... | 43/132.1 |
| 6,907,690 B1 * | 6/2005 | Stallings | ..................... | 43/132.1 |
| 7,032,346 B1 * | 4/2006 | Richard | ...................... | 43/132.1 |
| 7,057,516 B2 * | 6/2006 | Donskoy et al. | ........... | 43/132.1 |
| 7,086,197 B1 * | 8/2006 | Gronewald | ................. | 43/132.1 |
| 7,385,483 B2 * | 6/2008 | Lee | ............................. | 43/132.1 |
| 7,394,389 B2 * | 7/2008 | Nelson | ........................ | 43/124 |
| 2002/0174595 A1 * | 11/2002 | Hoshall | ....................... | 43/124 |
| 2003/0192230 A1 * | 10/2003 | Hoshall | ....................... | 43/124 |
| 2004/0163303 A1 * | 8/2004 | Berthold et al. | ............... | 43/124 |
| 2004/0200132 A1 * | 10/2004 | Hoshall | ....................... | 43/124 |
| 2005/0144833 A1 * | 7/2005 | Hoshall | ....................... | 43/132.1 |
| 2005/0246942 A1 * | 11/2005 | Mueller et al. | ................ | 43/124 |
| 2006/0017577 A1 * | 1/2006 | Broussard | ................... | 43/132.1 |
| 2007/0084105 A1 * | 4/2007 | Lindsay et al. | ............... | 43/132.1 |
| 2007/0175112 A1 * | 8/2007 | Janesky | ....................... | 52/169.5 |
| 2008/0127548 A1 * | 6/2008 | Chen et al. | .................. | 43/132.1 |
| 2008/0148624 A1 * | 6/2008 | Borth et al. | .................. | 43/132.1 |

FOREIGN PATENT DOCUMENTS

| | | | |
|---|---|---|---|
| JP | 2008017765 A | * | 1/2008 |
| WO | WO 03020022 A1 | * | 3/2003 |

* cited by examiner

SUBSURFACE INSECT DETECTION AND PESTICIDE INJECTION SYSTEM

CROSS REFERENCE TO RELATED APPLICATIONS

This application claims benefit of U.S. Provisional Application No. 60/905,290, filed Mar. 6, 2007, which is incorporated herein by reference in its entirety.

BACKGROUND OF THE INVENTION

1. Field of the Invention

The present invention relates generally to insect detection and control systems, and more particularly, but not by way of limitation, to an improved system for detecting the presence of subterranean insects in the vicinity of a structure as well as selectively injecting pesticide beneath a structure.

2. Brief Description of the Related Art

Overtime pests, such as termites, can do considerable damage to structures like homes and offices. The longer an infestation continues, the greater the damage to a structure may become and the more difficult it may become to eliminate the infestation. Thus, a need exists for an insect detection system that allows insects to be detected as early as possible, preferably before they have even entered the structure.

Numerous systems have been proposed for detecting subterranean insects in the vicinity of a structure such as a building or a home. Several of these systems involve placing bait stations in various locations around the perimeter of a structure. The bait stations are often baited with a piece of wood or other cellulose material for attracting termites. The bait stations can then be visually inspected to determine if insects have infested or are beginning to infest the area. Because these bait stations are intermittently placed around the perimeter of a structure, insects may still pass between the bait stations to infest the structure without providing any indication of their presence in a bait station.

Another system for detecting insect infestation involves the use of a gas-sensing probe. Holes are drilled through the drywall layer of an interior wall of the structure and the probe is inserted into the air space between the studs. The probe then samples the air for the presence of "tell-tale" gases such as carbon-monoxide, methane, and the like, that indicate the presence of insects within the walls of the structure.

Yet another previous attempt at early insect detection combines the two above-described systems by providing bait stations intermittently around the perimeter of the structure. In one such system, the bait stations are provided with an access point that permits a gas-sensing probe to be inserted into the bait stations to sample the air for "tell-tale" gases. In this system, each bait station must be individually checked with the probe. This process is labor-intensive and can be cost prohibitive, especially in the case of an individual homeowner that must either purchase the gas detecting probe or pay a professional to monitor each individual bait station.

In another similar system, the bait stations are each provided with a permanently-placed sensor that communicates with a central controller to continuously sample for the presence of "tell-tale" gases within the bait stations. The central controller is alerted and may send a signal or sound an alarm to announce the presence of insects. This system may also be cost-prohibitive, as it requires not only the installation of the bait stations, but an expensive electronic monitoring system as well.

To this end, a need exists for a subsurface insect detection system which is simple in design, inexpensive to install, and easy to operate and maintain. It is to such a system that the present invention is directed.

DETAILED DESCRIPTION OF THE INVENTION

Figure 1:
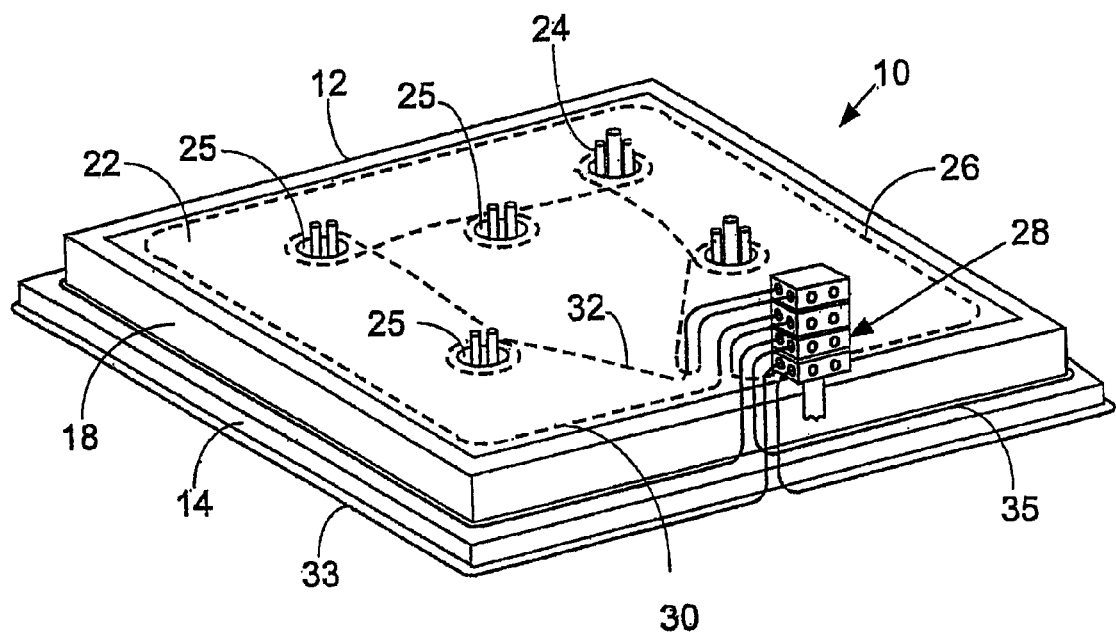
FIG. 1 is a perspective view of a foundation of a dwelling with an insect detection system constructed in accordance with the present invention installed along the foundation.
Figure 2:
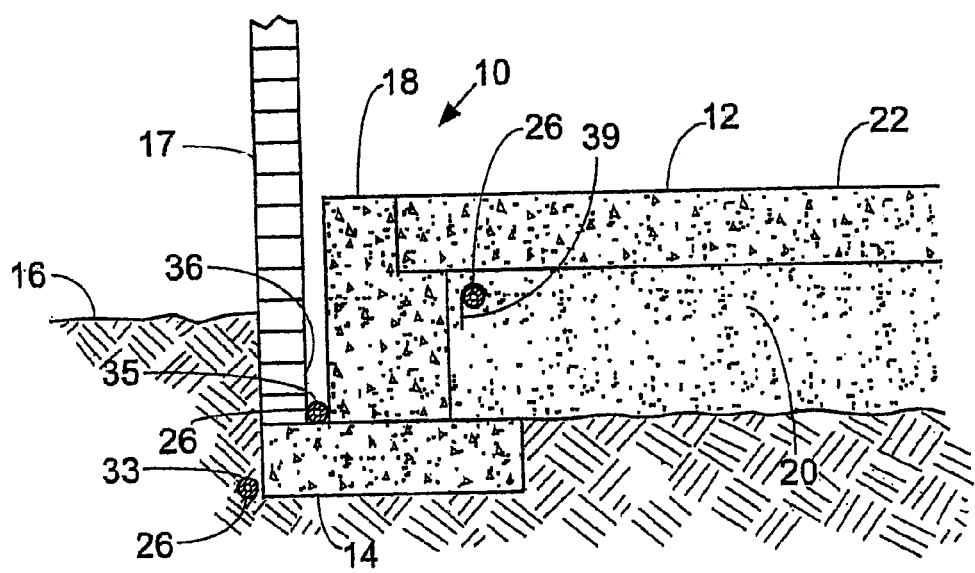
FIG. 2 is a cross-sectional view of a portion of the foundation illustrating the insect detection system installed along the foundation.

Referring now to the drawings and more particularly to FIGS. 1 and 2, an insect detection and pesticide injection system 10 constructed in accordance with the present invention is shown installed along a foundation 12 of a structure. The foundation 12 has a footing 14 formed in a base soil 16 (FIG. 2). The footing 14 provides a support surface for a brick exterior 17 (FIG. 2) and a stem wall 18 which generally defines a perimeter of the structure. A fill material 20, such as sand or gravel, is disposed on the base soil 16 within the perimeter of the stem wall 18, and a concrete slab 22 is formed on the fill material 20. A plurality of plumbing pipes 24, which run through the fill material 20, protrude up through the concrete slab 22.

Upon curing of the concrete slab 22, openings or cracks typically form between the stem wall 18 and concrete slab 22, as well as between the plumbing pipes 24 and the concrete slab 22, such as openings 25. These openings and cracks provide an entry point into the structure for pests and fluids, including water and vapors. Consequently, the area near the perimeter of the concrete slab 22 and the area adjacent where the plumbing pipes 24 protrude up through the concrete slab 22 require periodic attention to prevent pest infestation and accumulation of harmful fluids in the structure.

The subsurface insect detection and pesticide injection system 10 includes one or more circuits 30, 32, 33, and 35 of tubular conduit 26 positioned along the foundation of the structure. FIGS. 1 and 2 illustrate the system 10 having a circuit 30 which is positioned adjacent to the perimeter of the concrete slab 22 and a circuit 32 which is positioned to loop in close proximity to the upward extending plumbing pipes 24. The system 10 is also illustrated having a circuit 33 extending around the perimeter of the structure on the exterior side of the footing 14 and a circuit 35 positioned in a space 36 formed between the brick exterior 17 and the stem wall 18. The conduits 26 are preferably constructed of a porous, gas-permeable tubing such that "tell-tale" gases, produced by insect infestations, may enter the circuits 30, 32, 33, 35 for detection. The preferred conduits 26 will be described in more detail below, with reference to FIGS. 3 and 4.

The system 10 further includes a connector assembly 28 which permits access to the conduits 26 by a user, such as a homeowner or pest-control technician, for example. In this way, a user may evacuate a portion of the air within the system so as to pass it through a sensor that detects the presence of "tell-tale" gases that may result from an insect infestation. Air may be evacuated, via the connector assembly 28, from the system 10 by utilizing a vacuum source to suck air out, or by forcing outside air into the system so as to cause the air within the system to flow out. In other embodiments, a user may insert a sensor probe into the system 10 via the connector assembly 28 so as to sample air within the system 10 in its ambient state. The system 10 shown includes a versatile structure which may be well suited to a number of alternative uses, in addition to insect detection. For example, in the event that the sensor detects the presence of a "tell-tale" gas so as to indicate an insect infestation, a source of pressurized pesticide may be connected to the tubular conduits 26 via the connector assembly 28, such that pesticide may be selectively injected into the fill material to exterminate the insects and to form a chemical barrier against the infestation of pests into the structure through the openings of the concrete slab. In addition, a vacuum source may be connected to the tubular conduits so that fluids may be selectively extracted from the fill material to reduce the passage of fluids into the structure through the openings of the concrete slab. Several examples of alternative uses for the system are described in more detail in U.S. Pat. Nos. 6,446,383; 6,564,504; 6,782,655; 6,877, 272; all issued to Hoshall, and all of which are incorporated herein by reference.

As illustrated in FIG. 2, the tubular conduit 26 of the circuit 30 can be secured in the fill material 20 with a hook 39 to prevent the tubular conduit 26 from floating into the concrete slab 22 while the concrete slab 22 is being poured.

Figure 1A:
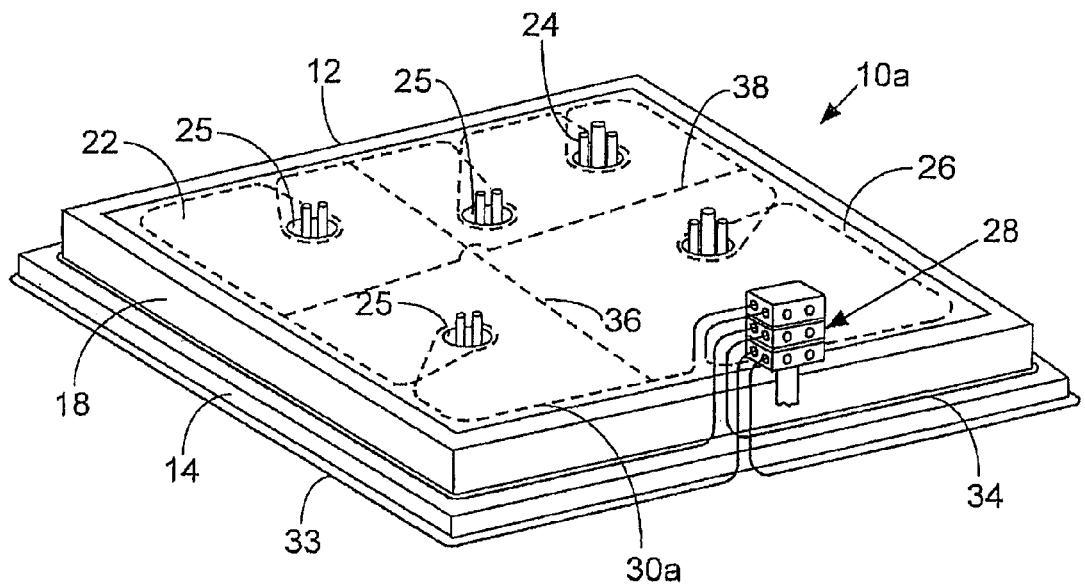
FIG. 1A is a perspective view of a foundation of a dwelling with a second embodiment of the insect detection system installed along the foundation.

FIG. 1A shows another embodiment of a pesticide injection system 10a. The pesticide injection system 10a includes a circuit 30a positioned under the foundation 12 of the structure. The circuit 30a is provided with cross members 36 and 37. The cross members 36 and 37 have the effect of making the circuit 30a a parallel flow circuit. A parallel flow circuit provides multiple flow paths to any particular point in the flow circuit. This is an advantage because if one particular segment of the circuit 30a becomes crimped or otherwise clogged, "tell-tale" gases will still be able to enter, and flow through, the circuit 30a on either side of the blockage. Furthermore, a parallel flow circuit generally has less of a pressure drop between the flow entrance and any point in the system, as compared with a series flow circuit. This results in a more uniform distribution of the gases within the tubular conduit 26, as well as a resulting higher likelihood of detection.

Figure 2A:
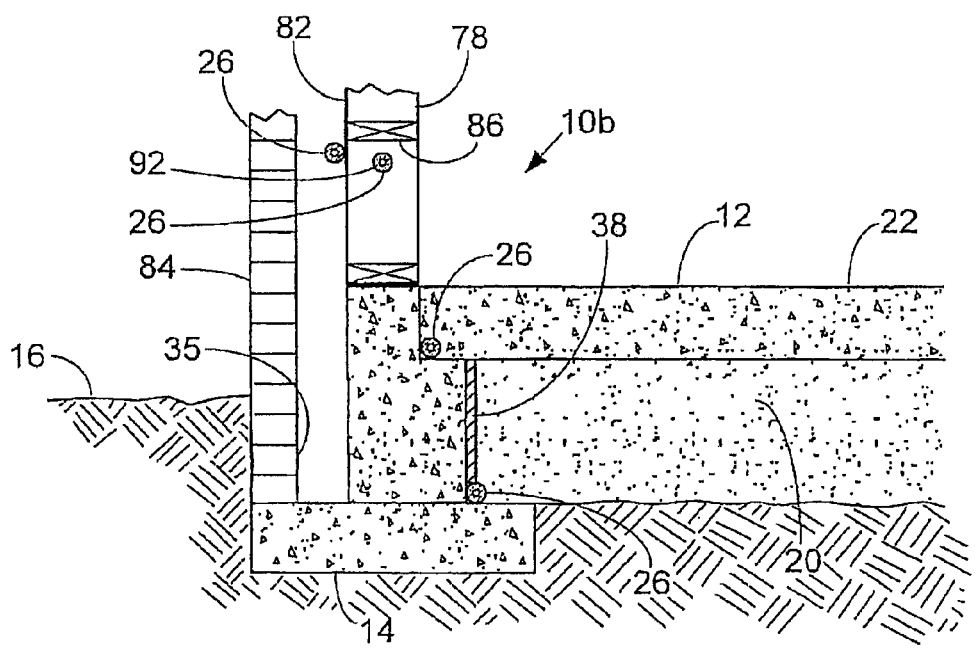
FIG. 2A is a cross-sectional view of a portion of a second embodiment of the insect detection system installed along the foundation.

FIG. 2A illustrates alternative locations for placement of the tubular conduit, such as tubular conduit 26. In one instance, it may be desirable to place the tubular conduit 26 in the lower portion of the fill material 20, as opposed to the upper portion of the fill material 20. More specifically, the tubular conduit 26 can be positioned along the lower end of an insulation material 92 fixed to the interior side of the stem wall 18 to prevent pests from migrating between the insulation material 92 and the stem wall 18. In another instance, it may be desirable to place the tubular conduit 26 at the perimeter of the stem wall 18 such that the tubular conduit 26 is positioned in the concrete slab 22 so as to be in the path of where cracks are likely to form between the stem wall 18 and the concrete slab 22. Prior to forming the concrete slab 22, the tubular conduit may be secured to the stem wall 18 with a suitable adhesive.

Figure 3:
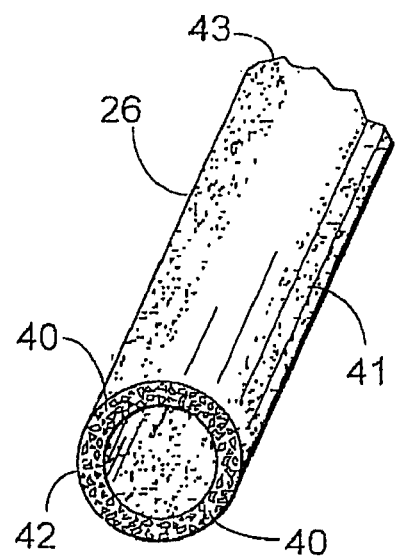
FIG. 3 is a perspective view of an elastomeric conduit used with the insect detection system of the present invention.
Figure 4:
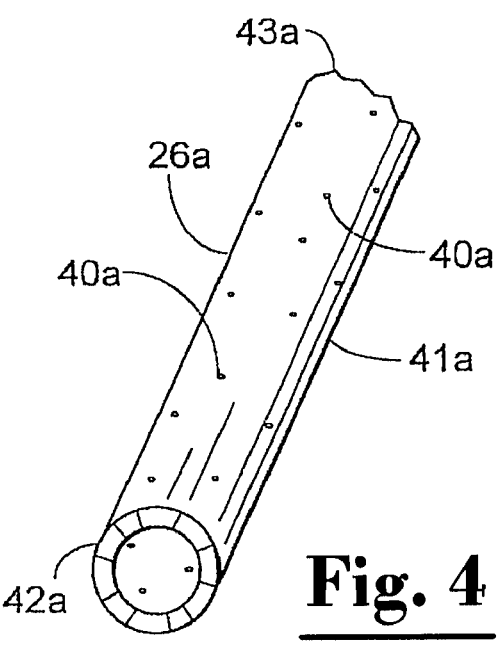
FIG. 4 is a perspective view of a second elastomeric conduit used in accordance with the insect detection system of the present invention.

Referring now to FIG. 3, the porous conduit 26 is generally tubular and has a sidewall 41, a first end 42, a second end 43, and a plurality of pores 40 extending through the sidewall 41 from the first end 42 to the second end 43. The tubular conduit 26 has a substantially circular cross-sectional configuration and is constructed of an elastomeric material, such as rubber, neoprene, or plastic. In the embodiment shown, the pores 40 generally have tortuous paths. In other embodiments, such as depicted in FIG. 4, the conduit 26 may have pores 40 that have a more direct path. As a result, upon applying a positive internal pressure to the tubular conduit 26, the sidewall 34 expands slightly thereby causing the pores 40 of the tubular conduit 26 to open and permit the release of fluid from the tubular conduit 26 into the fill material 20, in an injection mode for example. Upon applying a negative internal pressure to the internal conduit 26, the sidewall 34 collapses slightly, thereby causing the pores of the tubular conduit 26 to open inwardly and permit the drawing of fluid from the fill material 20 into the tubular conduit 26 in an extraction mode. Finally, upon removal of the positive and negative and internal pressures from the tubular conduit 26, the pores 40 are caused to close so as to be at least partially impermeable to liquid and debris. The conduit 26 is preferably still at least partially permeable to gas in the closed state. The closed state permits the pores 40 to remain substantially clog free while the tubular conduit 26 maintains a substantially circular cross-sectional configuration under the load of the fill material 20.

Referring now to FIG. 4, a second embodiment of the porous conduit 26a is shown. The porous conduit 26a is generally tubular and has a sidewall 41a, a first end 42a, a second end 43a, and a plurality of pores 40a extending through the sidewall 41a from the first end 42a to the second end 43a. The tubular conduit 26a is essentially equivalent in function to the conduit 26, with the noteworthy difference that the pores 40a generally have straight or direct paths through the sidewall 41a, rather than tortuous paths.

Examples of suitable conduits are disclosed in U.S. Pat. No. 4,003,408, assigned to George C. Ballas, trustee, and U.S. Pat. No. 5,474,398, assigned to Aquapore Moisture Systems, Inc. of Phoenix, Ariz., both of which are hereby expressly incorporated herein.

Figure 5:
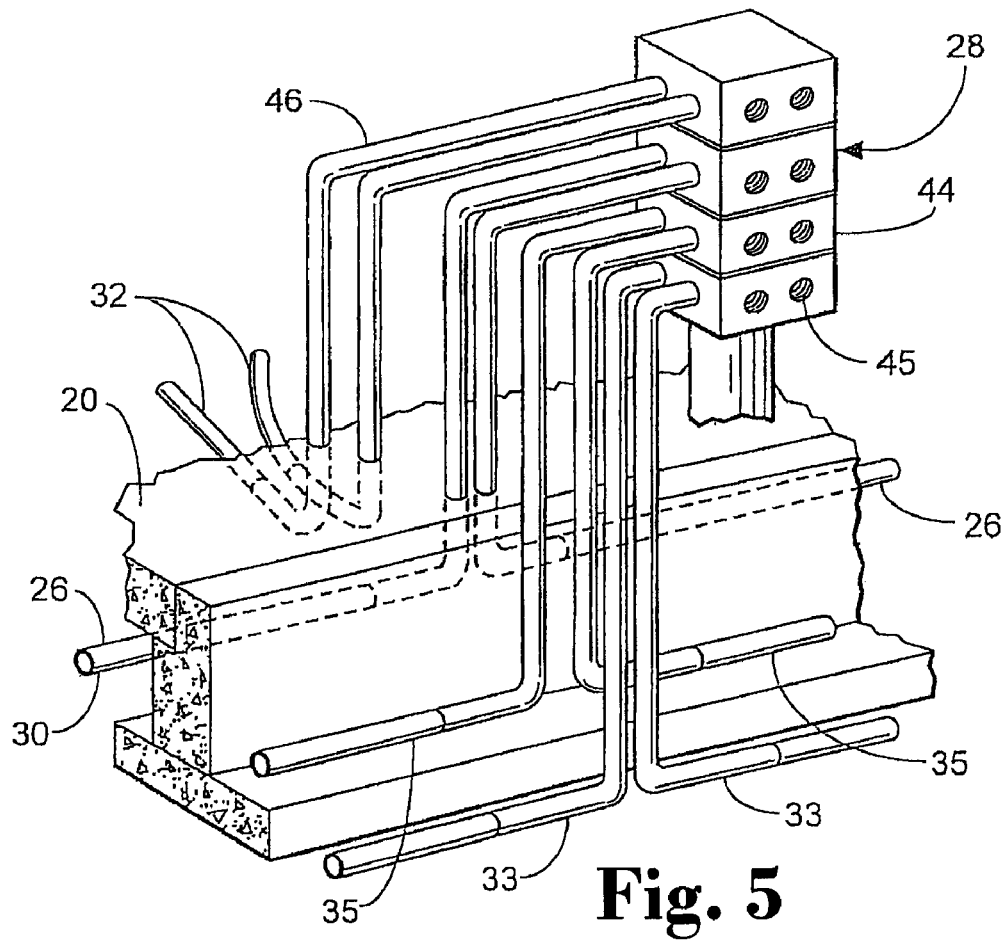
FIG. 5 is a partially cutaway, perspective view of a service panel of the subsurface pesticide injection and fluid extraction system of the present invention.

As illustrated in FIG. 5, the connector assembly 28 includes an access box 44 having a plurality of access ports or female connector members 45 (only one of the access ports being designated in FIG. 5) and a plurality of nonporous tubular conduits 46 (only one of the nonporous tubular conduits being designated in FIG. 5) for establishing fluid communication between the access ports 45 and the porous conduits 26. The nonporous tubular conduits 46 are preferably constructed of a relatively flexible material, such as polyethylene. The access box 44 includes an access port 45 for each end of the tubular conduit 26 for each circuit 30, 32, and 33, and 35. Each nonporous tubular conduit 46 is disposed in one end of a corresponding porous tubular conduit 26 and the porous tubular conduit 26 is secured thereto with a suitable device, such as a hose clamp (not shown).

Each access port 45 is adapted to interface with a gas detecting sensor (not shown) such that the presence of "telltale" gases within the system 10 may be discovered, for example, by inserting a probe into the access port 45 or by vacuuming air out of the system 10, via the access port 45, and passing it through the gas detecting sensor (not shown). A gas detecting sensor may be attached to each of the access ports 45 or to only one of the access ports 44. If the gas detecting sensor is connected to only one of the access ports 45 for a given circuit 30, 32, 33, or 35, the other access port 45 for the given circuit 30, 32, 33, 35 is preferably plugged with a cap (not shown). The access ports 45 may further be adapted to permit other uses of the system 10, as described in the above-incorporated Hoshall patents. For example, upon discovery of an insect infestation, it will be highly desirable to inject pesticide into the system so as to kill the insects and provide a chemical barrier against re-infestation. To this end, the access ports 45, or their alternatives herein described, are preferably adapted to receive a source of pressurized pesticide as well. In other embodiments, the access ports may be adapted to interface with a vacuum source which could be used to extract excess or undesirable fluids from beneath the foundation.

The access ports 45 are illustrated as being configured for threaded attachment with the gas detecting sensor, source of pressurized pesticide, or a vacuum source. The access box 44 can be located in any convenient location such as on a wall of a garage, in a utility closet, or on an exterior wall of the structure.

Figure 6:
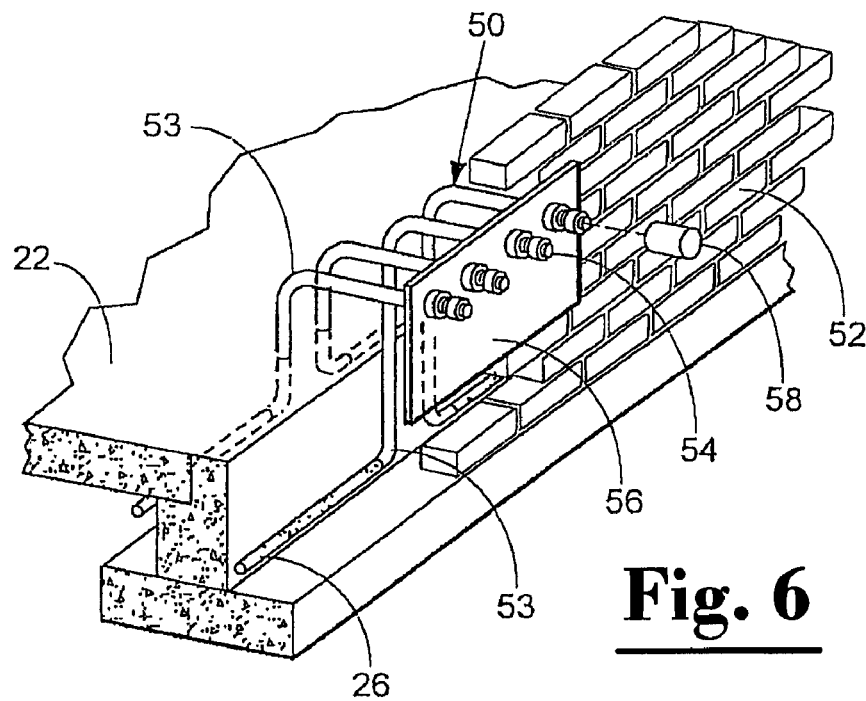
FIG. 6 is a perspective view of another embodiment of a service panel of the subsurface pesticide injection and fluid extraction system of the present invention.

FIG. 6 illustrates another embodiment of a connector assembly 50 shown mounted to an exterior wall 52 of a structure. Like the connector assembly 28, the connector assembly 50 includes a plurality of nonporous tubular conduits 53. Each nonporous tubular conduit 53 of the connector assembly 50 is provided with a male connector member 54, rather than a female connector member as with the connector assembly 28. The male connector members 54 are shown to extend from the wall 52 and to be supported by a support plate 56.

Each male connector 54 is adapted to interface with a gas detecting sensor (not shown) such that the presence of "telltale" gases within the system 10 may be discovered, for example, by inserting a probe into the access port 45 or by vacuuming air out of the system 10, via the access port 45, and passing it through the gas detecting sensor (not shown). A gas detecting sensor may be attached to each of the male connector members 54 for a given circuit 30, 32, 33, or 35, whereby air is caused to flow through the porous conduit 26, either by applying vacuum or pressure to one of the two male connector members 54, or to only one of the access ports 45. If the gas detecting sensor is connected to only one of the access ports 45 for a given circuit 30, 32, 33, or 35, the other access port 45 for the given circuit 30, 32, 33, 35 is plugged with a cap (not shown). The male connectors 54 may further be adapted to permit other uses of the system 10, as described in the above-incorporated Hoshall patents.

Like the access box 44 of the connector assembly 28, the male connector members 54 can also be located in any other convenient location such as on a wall of a garage or in a utility closet.

Figure 7:
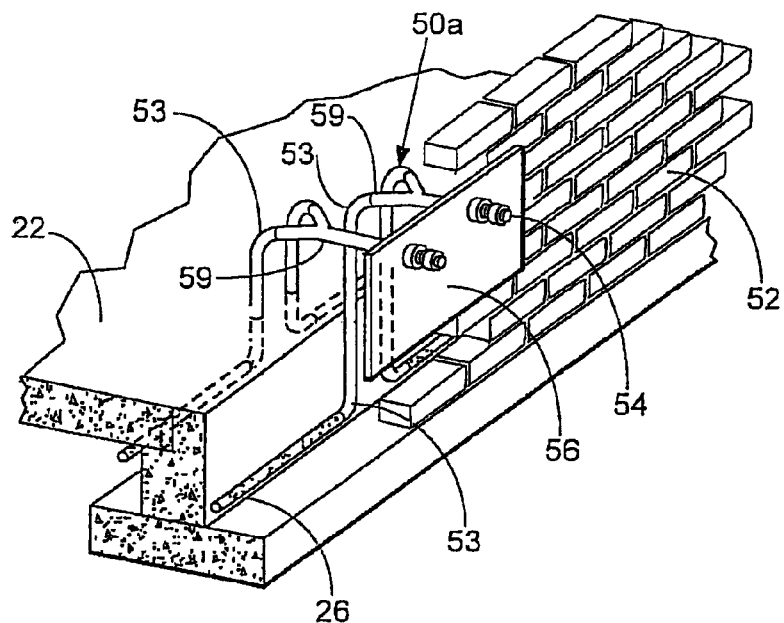
FIG. 7 is a perspective view of yet another embodiment of a service panel of the subsurface pesticide injection and fluid extraction system of the present invention.

FIG. 7 illustrates a connector assembly 50a which is similar to the connector assembly 50 described above with the exception that a Y-connector 59 is attached to the ends of each corresponding nonporous tubular conduit 53 to provide a single point of injection and evacuation for each circuit. Injection of pesticide and evacuation of fluids is made via the male connectors 54. Use of the Y-connector 59 permits air to be simultaneously drawn through both ends of the porous conduit 26.

Figure 8:
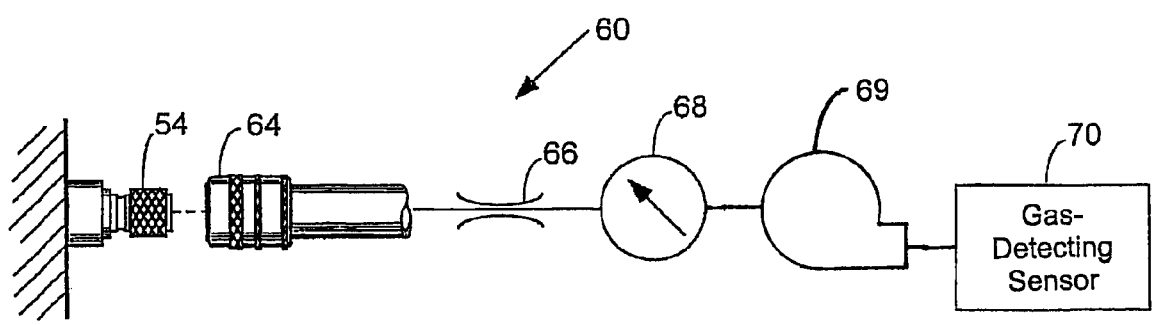
FIG. 8 is a side elevational view of a hose adaptor for permitting the connection of a gas detection sensor to the insect detection system.

Referring now to FIG. 8, a connection assembly 60 for use in detecting "tell-tale" gases is shown. The connection assembly 60 includes an adapter hose 64 for connection with a connector member (shown as the connector member 54 in FIGS. 6 and 7), a flow regulator 66, and a flow meter 68, a pump 69, and a gas detecting sensor 70.

The flow regulator 66 functions to restrict the flow of air from the tubular conduit 26 so that the gas within the tubular conduit 26 may be removed and sampled in substantially the same compositional state as it exists within the conduit 26 under ambient conditions. The flow meter 68 displays the flow rate of the gas being removed from the conduit such that the rate of removal can be monitored, for example to stay within optimum operating parameters of the gas detecting sensor 70.

FIG. 8 illustrates a pump 69 suitable for creating a negative internal pressure in the tubular conduit 26 whereby gas may be selectively extracted from beneath the foundation 12 of the structure and drawn into the tubular conduit 26. The pump 69 is adapted to be attached to and detached from the connector assembly male connector member 54 quickly and easily. It should be appreciated that any suitable pump may be used and that other devices, such as a fan or a pressure source, may be employed to create a negative internal pressure.

The gas detecting sensor 70 is generally an electronic device capable of detecting the presence of "tell-tale" gases such as carbon dioxide and methane, which may indicate the presence of insects such as termites. The gas detecting sensor 70 may include a probe, such as the one disclosed in U.S. Pat. No. 6,255,652, issued to Moyer, which is hereby incorporated by reference in its entirety. The gas detecting sensor 70 may also incorporate a continuous-monitoring system that remains permanently connected to the connector assembly 28, 50, or 50a. In some embodiments, the gas detecting sensor 70 may include a vacuum source to draw gas into the tubular conduit 26 for evaluation, or may include a fan or pressure source to draw gas into the tubular conduit 26 for measurement, such as in the embodiment of FIG. 6. Such gas detecting sensors 70 are well known in the art, and no further description is deemed necessary to implement the present invention.

Figure 9:
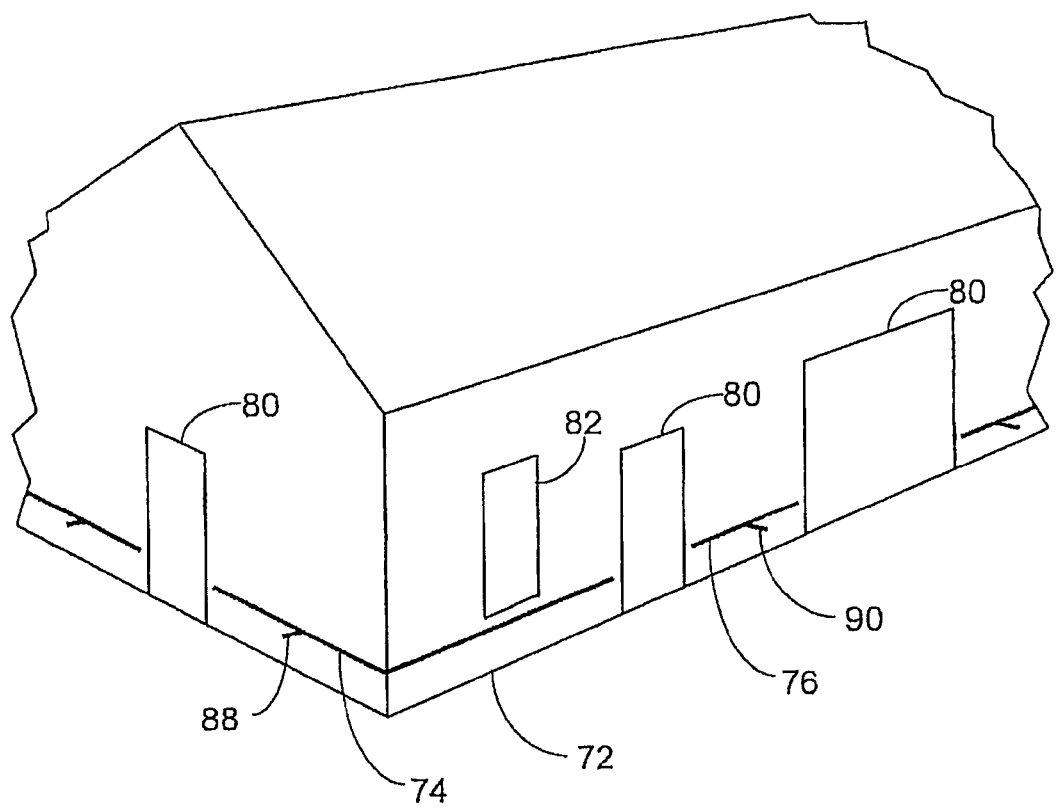
FIG. 9 is perspective view of another embodiment of an insect detection system constructed in accordance with the present invention shown installed in a structure.

FIG. 2A and FIG. 9 illustrates another embodiment of a pesticide injection system 10b installed along a structure 72. The pesticide injection system 10b includes a plurality of circuits, such as circuits 74 and 76. A location of the structure 72 vulnerable to insect damage is at a lower part of an exterior wall 78. While a gasket (not shown) is typically positioned at the bottom of the exterior wall 78 and the top of the stem wall 18, gaps and channels nevertheless often exists between the bottom of the exterior wall 78 and the stem wall 18. Consequently, moist air from inside the structure is caused to pass from the structure 72 through the gaps and channels as a result of pressure changes within the structure 72, such as when a door is opened or closed. The moist air, in turn, condenses on the cooler exterior surface of the exterior wall 78, thereby resulting in the growth of mold and mildew and creating an attractant for pests.

As shown in FIG. 9, the structure 72 includes a plurality of passageways, such as doors 80 and windows 82. The circuits 74 and 76 are positioned in the space 35 between an exterior facing 84 and the exterior wall 78 above the level of the concrete slab 22 and the stem wall 18 but below the bottom of the lowest window 82 of the structure 72 (as shown in FIG. 2A). Each circuit 74 and 76 extends between doors 80 along the perimeter of the structure 72. Each circuit 74 and 76 terminates at one of the doors 80, as opposed to running above the doors 80 so that the tubular conduit 26 is maintained in a substantially horizontal orientation along its length to allow for uniform distribution of the pesticide. Each circuit 74 and 76 has an access port 88 and 90, respectively, for interfacing with a gas detection sensor 70. When an exterior facing is utilized that does not result in the formation of the space 35, the tubular conduit 26 of the circuits 74 and 76 is preferably positioned near the bottom of the exterior wall 78.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A subsurface pest detection system in combination with a structure having a foundation, the system comprising:
    a tubular conduit disposed adjacent the foundation of the structure, the tubular conduit having a sidewall, a first end, a second end, and a plurality of pores extending through the sidewall of the tubular conduit, the tubular conduit having a substantially circular cross-sectional configuration and constructed of an elastomeric material such that upon applying a negative internal pressure to the tubular conduit the pores of the tubular conduit are caused to open to permit the drawing of gas into the tubular conduit, and upon removal of the negative internal pressure the pores are caused to close so that the pores remain substantially clog free;
    means for applying a negative internal pressure to the tubular conduit to cause the pores of the tubular conduit to open and cause gas to be drawn into the tubular conduit; and
    a gas detecting sensor in gas communication with the tubular conduit to monitor the gas in the tubular conduit for the presence of a gas that indicates the presence of pests near the foundation of the structure.

2. The combination of claim 1 wherein the gas detecting sensor includes the means for applying the internal pressure.

3. The combination of claim 1 wherein the pores of the tubular conduit are tortuous.

4. The combination of claim 1 wherein the foundation is formed in a base soil, and wherein the tubular conduit is disposed within the base soil adjacent an exterior side of the foundation.

5. The combination of claim 1 wherein the foundation of the structure defines a perimeter of the structure, and wherein the tubular conduit is disposed on an interior side of the foundation.

6. The combination of claim 1 wherein the structure has an exterior facing, and wherein the tubular conduit is disposed adjacent an interior side of the exterior facing of the structure.

7. A subsurface pest detection and pesticide injection system in combination with a structure having a foundation, the system comprising:
    a tubular conduit disposed adjacent the foundation of the structure, the tubular conduit having a sidewall, a first end, a second end, and a plurality of pores extending through the sidewall of the tubular conduit, the tubular conduit having a substantially circular cross-sectional configuration and constructed of an elastomeric material such that upon applying a negative internal pressure to the tubular conduit the pores of the tubular conduit are caused to open to permit the drawing of gas into the tubular conduit, upon applying a positive internal pressure to the tubular conduit the pores of the tubular conduit are caused to open to permit the release of pesticide from the tubular conduit, and upon removal of the negative internal pressure and the positive internal pressure the pores are caused to close so that the pores remain substantially clog free;
    means for applying a negative internal pressure to the tubular conduit to cause the pores of the tubular conduit to open and cause gas to be drawn into the tubular conduit;
    a gas detecting sensor in gas communication with the tubular conduit and selectively detachable therefrom, the gas detecting sensor capable of monitoring the gas in the tubular conduit for the presence of a gas that indicates the presence of pests near the foundation of the structure; and
    a source of pressurized pesticide selectively connectable to the tubular conduit so as to apply a positive internal pressure to the tubular conduit and cause the pores of the tubular conduit to open and permit the release of pesticide from the tubular conduit adjacent the foundation of the structure.

8. The combination of claim 7 wherein the gas detecting sensor includes the means for applying the internal pressure.

9. The combination of claim 7 wherein the pores of the tubular conduit are tortuous.

10. The combination of claim 7 wherein the foundation is formed in a base soil, and wherein the tubular conduit is disposed within the base soil adjacent an exterior side of the foundation.

11. The combination of claim 7 wherein the foundation of the structure defines a perimeter of the structure, and wherein the tubular conduit is disposed on an interior side of the foundation.

12. The combination of claim 7 wherein the structure has an exterior facing, and wherein the tubular conduit is disposed adjacent an interior side of the exterior facing of the structure.

13. A method for detecting pests and for delivering a pesticide adjacent a structure, the method comprising:
    placing a tubular conduit adjacent a foundation of the structure, the tubular conduit having a sidewall, a first end, a second end, and a plurality of pores extending through the sidewall of the tubular conduit, the tubular conduit having a substantially circular cross-sectional configuration and constructed of an elastomeric material such that upon applying a positive internal pressure to the tubular conduit the pores of the tubular conduit are caused to open to permit the release of pesticide from the tubular conduit, upon applying a negative internal pressure to the tubular conduit the pores of the tubular conduit are caused to open to permit gas to be drawn into the tubular conduit, and upon removal of the positive and negative internal pressures the pores are caused to close so that the pores remain substantially clog free;
    connecting a gas detecting sensor to the tubular conduit;
    forming a negative internal pressure in the tubular conduit to cause gas to be drawn into the tubular conduit and into contact with the gas detecting sensor to monitor the presence of a gas that indicates the presence of pests near the structure;

disconnecting the gas detecting sensor from the tubular conduit;

connecting a source of pesticide to the tubular conduit; and injecting the pesticide through the tubular conduit at a sufficient pressure to apply a positive internal pressure to the tubular conduit and cause the pores of the tubular conduit to open and permit the release of pesticide from the tubular conduit adjacent the foundation of the structure.

14. The method of claim 13 wherein the pores of the tubular conduit are tortuous.

15. The method of claim 13 wherein the foundation is formed in a base soil, and wherein the tubular conduit is disposed within the base soil adjacent an exterior side of the foundation.

16. The method of claim 13 wherein the foundation of the structure defines a perimeter of the structure, and wherein the tubular conduit is disposed on an interior side of the foundation.

17. The method of claim 13 wherein the structure has an exterior facing, and wherein the tubular conduit is disposed adjacent an interior side of the exterior facing of the structure.

* * * * *